US006301562B1

(12) United States Patent
Azima et al.

(10) Patent No.: US 6,301,562 B1
(45) Date of Patent: Oct. 9, 2001

(54) SPEECH RECOGNITION USING BOTH TIME ENCODING AND HMM IN PARALLEL

(75) Inventors: Henry Azima, Cambridge (GB); Charalampos Ferekidis, Barsinghausen OT Barrigsen (DE); Sean Kavanagh, Cambridgeshire (GB)

(73) Assignee: New Transducers Limited, London (GB)

(*) Notice: Subject to any disclaimer, the term of this patent is extended or adjusted under 35 U.S.C. 154(b) by 0 days.

(21) Appl. No.: 09/559,760

(22) Filed: Apr. 27, 2000

Related U.S. Application Data

(60) Provisional application No. 60/150,594, filed on Aug. 26, 1999.

(30) Foreign Application Priority Data

Apr. 27, 1999 (GB) ..... 9909534

(51) Int. Cl.[7] ..... G01L 15/00

(52) U.S. Cl. ..... 704/257; 704/256; 704/241; 704/236; 704/251; 704/231

(58) Field of Search ..... 704/251, 257, 704/231, 211

(56) References Cited

U.S. PATENT DOCUMENTS

| | | | | |
|---|---|---|---|---|
| 5,091,949 | * | 2/1992 | King | 704/253 |
| 5,101,434 | * | 3/1992 | King | 704/241 |
| 6,070,140 | * | 5/2000 | Tran | 704/275 |
| 6,101,462 | * | 8/2000 | King | 704/253 |

FOREIGN PATENT DOCUMENTS

| | | |
|---|---|---|
| 2 020 517 A | 11/1979 | (GB) . |
| 2 084 433 A | 4/1982 | (GB) . |
| 2 162 024 A | 1/1986 | (GB) . |
| 2 162 025 A | 1/1986 | (GB) . |
| 2 179 183 A | 2/1987 | (GB) . |
| 2 187 586 | 9/1987 | (GB) . |
| WO 92/15089 | 9/1992 | (WO) . |
| WO 97/31368 | 8/1997 | (WO) . |
| WO 97/45831 | 12/1997 | (WO) . |
| WO 98/08188 | 2/1998 | (WO) . |

OTHER PUBLICATIONS

Joubert et al ("Speech Recognition Using TES Symbols," South African Symposium on Communications and Signal Processing, Aug. 1990).*

Warner et al ("AA Direct Voice Input Man–Machine Interface Strategy to Provide Voice Access for Severely Impaired Speakers," UK IT 1990 Conference, May 1990).*

L. J. Joubert et al., "Speech Recognition Using TES Symbols,"COMSIG 1991 Proceedings, XP002145192, pp. 116–119.

R. King, "Time Domain Analysis Yields Powerful Voice Recognition," New Electronics, vol. 27, No. 3, Mar. 1, 1994, pp. 12–14.

* cited by examiner

*Primary Examiner*—Richemond Dorvil
*Assistant Examiner*—Daniel A. Nolan
(74) *Attorney, Agent, or Firm*—Foley & Lardner

(57) ABSTRACT

A speech recognition method that combines time encoding and hidden Markov approaches. The speech is input and encoded using time encoding, such as TESPAR. A hidden Markov model generates scores; the scores are used to determine the speech element; and the result is output.

15 Claims, 4 Drawing Sheets

51
speech input
52
time slicer
53
time encoding
56
frequency encoding
tesgram
54
spectrogram
57
hidden Markov model
55
output speech element
58 speech input
61
63
time encoding
feature location
65
67
HMM
69
speech output

SPEECH RECOGNITION USING BOTH TIME ENCODING AND HMM IN PARALLEL

This application claims the benefit of provisional application No. 60/150,594, filed Aug. 26, 1999.

BACKGROUND

The invention relates to a speech recognition method and a system for carrying out the method.

A number of prior art speech recognition systems are known. Most commercial approaches use a hidden Markov model (HMM). In this model, short intervals of speech are processed using a probabilistic model of the likelihood of any given word or sub-word producing a given output. The short intervals of speech may overlap, and may be parameterised by spectral parameters, for example output from a filter bank, a discrete Fourier transform, or even the parameters from a linear predictive coding analysis of the input speech. The best match of the input speech to the model is then determined. The values of probability used in the model are generated using a training phase. This approach, being standard in the art, is conventional and will not be further described.

Many commercial packages use this approach together with a linguistic engine that uses information about the language spoken to cut down the likely possibilities. This approach has led to several packages achieving hit rates of about 97%. There is, however, a need to increase this figure.

An approach known as time encoded speech (TES), or TESPAR, has been described in GB 2020517, GB 2084433, GB 2162024, GB 2162025, GB 2187586, GB 2179 183, WO 92/15089, WO97/31368, WO97/45831 and WO98/08188, which are hereby incorporated by reference in their entirety. In this approach, speech is coded into a small number of symbols. Speech recognition systems using speech encoded in this way have been proposed, inter alia, in WO 97/45831 and GB 2 187 586. However, the approach does not appear to have been widely implemented; it is believed that high recognition rates have not been achieved with the system.

According to the invention there is provided a speech recognition method including

- inputting speech to be recognised,
- encoding the input speech using time encoding,
- using a hidden Markov model to determine scores indicating how the input speech matches some or all of a plurality of speech elements,
- determining which, if any, speech element best corresponds to the input speech using the time encoded speech and the Markov scores, and
- outputting the speech element, if any, so determined.

The speech waveform may be characterised by fluctuations in pressure about a mean value, which will be considered the "zero" value for the purposes of time encoding, described below. The input function is therefore a single valued function that oscillates about a zero value with a finite range of frequencies. Such a band-limited function is ideally suited to TESPAR analysis.

Once the input device has recorded the speech waveform some form of pre-processing is usually in order. This may include filtering the signal to remove frequencies outside the bandwidth covered by speech. For frequency analysis using the HMM method the signal is then divided into short time segments (say 10 ms).

TESPAR can be used with a signal that is broken up into any length of time. Therefore, the signal can be divided up into short time segments in a similar manner to that used in the HMM. Alternatively, the signal can be divided up into separate words, phrases or even sentences. TESPAR can be used directly to divide up the signal according to some criterion. An example is finding the end points of an utterance. An example of how this can be achieved is to take short time segments and encode each segment into an 'S' matrix. If the sum of the matrix elements for each time segment is found the result is a vector of numbers indicating how much sound is present in each. This can then be used to find the transitions between sound and silence and hence the end points of the utterance.

There are many ways in which the speech signal may be time encoded. An example of the time encoding procedure is now described. The first step is to divide the signal to be encoded into sections at the points where the signal crosses the zero line. These sections are referred to as epochs. Each epoch is then categorised according to its duration, the number of complex zeros that occur in its duration and the maximum amplitude of the signal. The epochs in the list are then assigned to particular groups and the resulting distribution of epochs in the different groups is used to characterise the encoded signal. In a simple case this could mean assigning each epoch to a group determined by its shape, duration and magnitude. The simple one-dimensional histogram of the number of epochs in each group is then used to characterise the signal.

The Hidden Markov Model (HMM) may take short segments of the input signal and Fourier transform them. The resulting spectrum may then be used to assign the time segment to a particular sub-phone. The sequence of these sounds may then be fed into the model and a probability output for each word considered. Thus a ranking of words is produced that specifies which word was most likely to have given rise to the observed speech waveform.

One possible method of enhancing the recognition process is to use the time encoded signal to provide additional input parameters for the HMM. One such possibility is for the time encoded signal to be used to determine the identity of the speaker so that the HMM parameters may be modified accordingly.

Both the HMM and the TESPAR system produce probabilities for matches between the input speech and the speech elements in the systems vocabulary. TESPAR is, in addition, well suited to distinguishing between a predetermined selection of sounds. Thus if one model narrows the number of likely words corresponding to the input speech down to a number of possibilities the other model will probably be able to select which is the most likely from the shortlist. In this way the overall accuracy of the speech recognition system can be enhanced by including information from the time domain, in the form of TESPAR encoding, as well as information from the frequency domain.

Various methods exist for deriving scores for different speech elements using the TESPAR method. For example, correlation scores can be found between the matrix generated from the input signal and the archetype matrix for each speech element. More commonly a neural net can be trained, using known examples, to differentiate between different speech elements.

The time encoding may include the steps of

- identifying the intervals between the occurrences of the input parameter crossing a given value, and quantising the lengths of the intervals,
- identifying the number of complex zeroes of the input parameter, up to a predetermined rank, in the said intervals, and recording the quantised lengths of the intervals and a measure of the said number of complex zeroes up to a predetermined rank as a representation of the variation of the input parameter.

A predetermined rank of 1 has been found to give good results. In this case the method records the number of first rank zeroes, i.e. positive minima or negative maxima. This information may provide sufficient detail for useful characterisation without requiring excessive calculation.

The method thus parameterises the shape of the input parameter function. If the parameter rises smoothly to a maximum and then falls smoothly to the next zero, there will be no positive minima so said number will be zero.

If the function has an "M" shape, rising to a maximum, falling to a minimum and then rising to another maximum before passing through zero, then there will be one positive minimum so the said number will be one.

Thus, the number parameterises the number of oscillations of the input parameter between zeroes, i.e. in each epoch.

The reason that the positive minima or negative maxima are known as complex zeroes of a function is that they correspond to zeroes of the function for complex number inputs to the function. The first rank zeroes occur at real values being the real values of the complex numbers for which the function has a value zero.

The coding method may be a TESPAR method .

The method may further comprise the step of generating a code number taking one of a set of predetermined values representing the duration of the interval and number of maxima and minima for at least some of the said intervals.

The code numbers may be further parameterised. In one approach an S matrix may be calculated. The S matrix records the number of instances of each code number in the recorded variation of the input parameter. Alternatively or additionally an A matrix recording the number of instances of a first code number following a second code number with a predetermined lag may be calculated. A further alternative is to calculate a DZ matrix recording the number of instances of amplitude, length of interval and number of maxima and minima increasing, decreasing or staying the same in the next epoch.

The S, A and/or DZ matrices may be stored or evaluated.

The invention is based on the realisation that the time encoded speech engine can greatly improve the performance of existing systems. This is because its speech coding is essentially orthogonal to the parameters used in conventional speech processing. Moreover, the time encoded speech coding can be efficiently implemented, so the method can be performed with little computing power. Since the version of time encoded speech processing known as TESPAR can describe a word with only 26 symbols, its addition to existing speech processing systems allows the increase of their performance with little processing downside.

Preferably, the step of determining the best corresponding speech element also uses linguistic analysis of previously output speech elements.

The time-encoded method is preferably a system that encodes the speech based on intervals between zero-crossings and the number of maxima and minima in each interval. Further preferably, a reduced number of characters is selected to encode the intervals and the number of maxima and minima. The encoding method may be the TESPAR method described in the above-mentioned published patents.

A second aspect of the invention provides a speech recognition system comprising speech capture system for inputting speech to be recognised, a hidden Markov speech recognition system for determining scores indicating how the input speech matches some or all of a plurality of speech elements, a time encoded speech system for encoding the input speech, and a decision system for determining which, if any, speech element best corresponds to the input speech using the time encoded speech and the Markov scores.

In a third aspect, the invention provides a computer program recorded on a data carrier operable to control a computer system having a processing unit, a speech input and an output system, the program operable to control the computer system to carry out the method of inputting speech to be recognised, encoding the input speech using time encoding, using a hidden Markov model to determine scores indicating how the input speech matches some or all of a plurality of speech elements, determining which, if any, speech element best corresponds to the input speech using the time encoded speech and the Markov scores, and outputting the speech element, if any, so determined.

BRIEF DESCRIPTION OF THE DRAWING

For a better understanding of the invention, specific embodiments of the invention (including the best mode) will now be described, purely by way of example, with reference to the accompanying drawings, in which.

DETAILED DESCRIPTION

Figure 1:
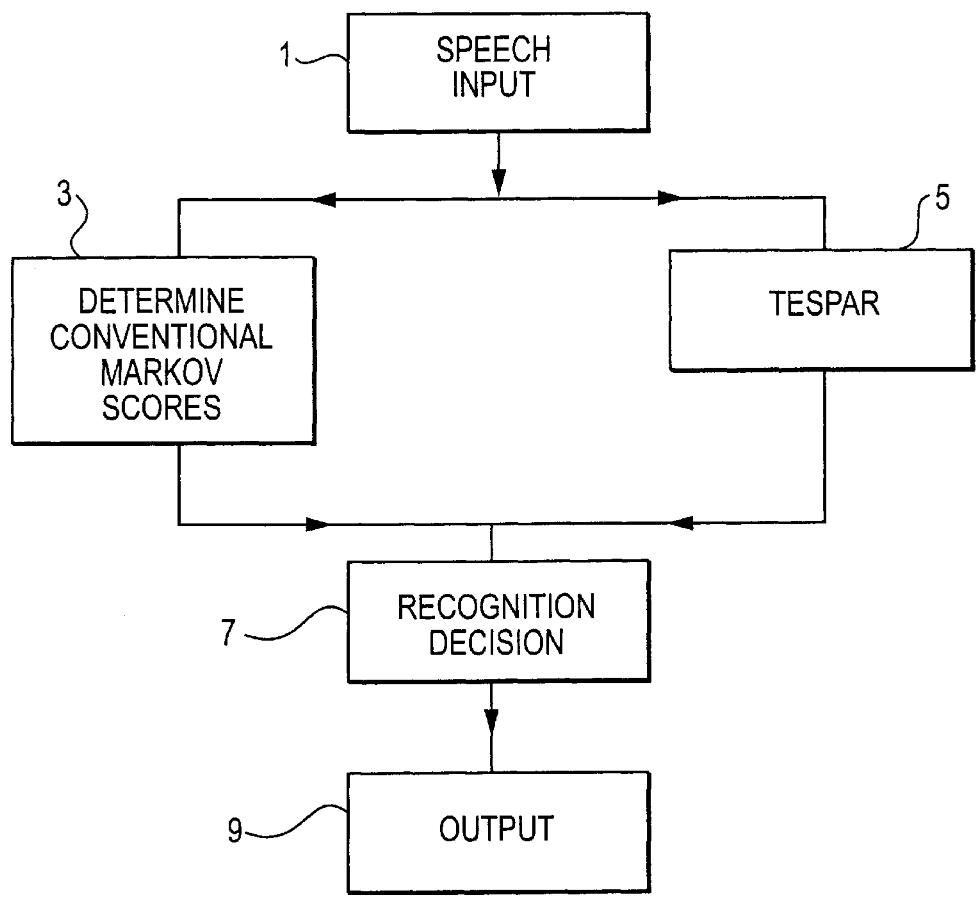
FIG. 1 is a flow diagram of a general speech recognition method according to the invention.
Figure 2:
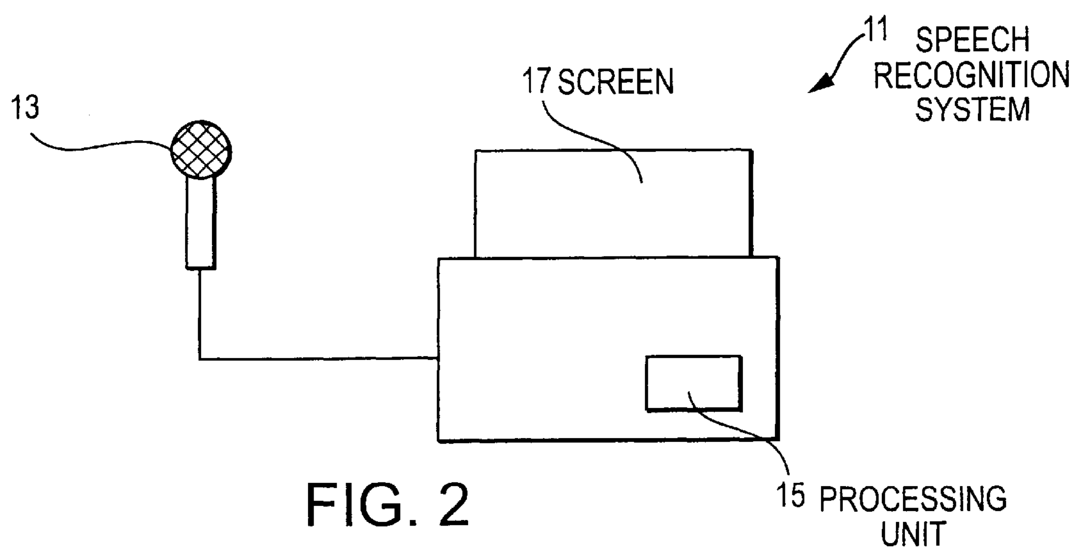
FIG. 2 is a schematic illustration of a system according to the invention.

Referring to FIGS. 1 and 2, in step 1, speech is input into the speech recognition system 11 using a microphone 13. Alternatively, the speech could be recorded on a carrier and loaded into the system directly, or even transmitted over a network connection to the system 11.

In step 3, conventional Markov speech processing, using a hidden Markov model, is performed in a processing unit 15 contained in the system 11, which will not be described further since it is well known. The output is a number of scores which indicate how good the match is between the input speech and each of a number of candidate speech elements.

At the same time, in step 5, TESPAR coding is performed, as described in the aforementioned patents. This step may be performed in software, or it may also be performed in hardware, since the method may be readily implemented in hardware.

Figure 7:
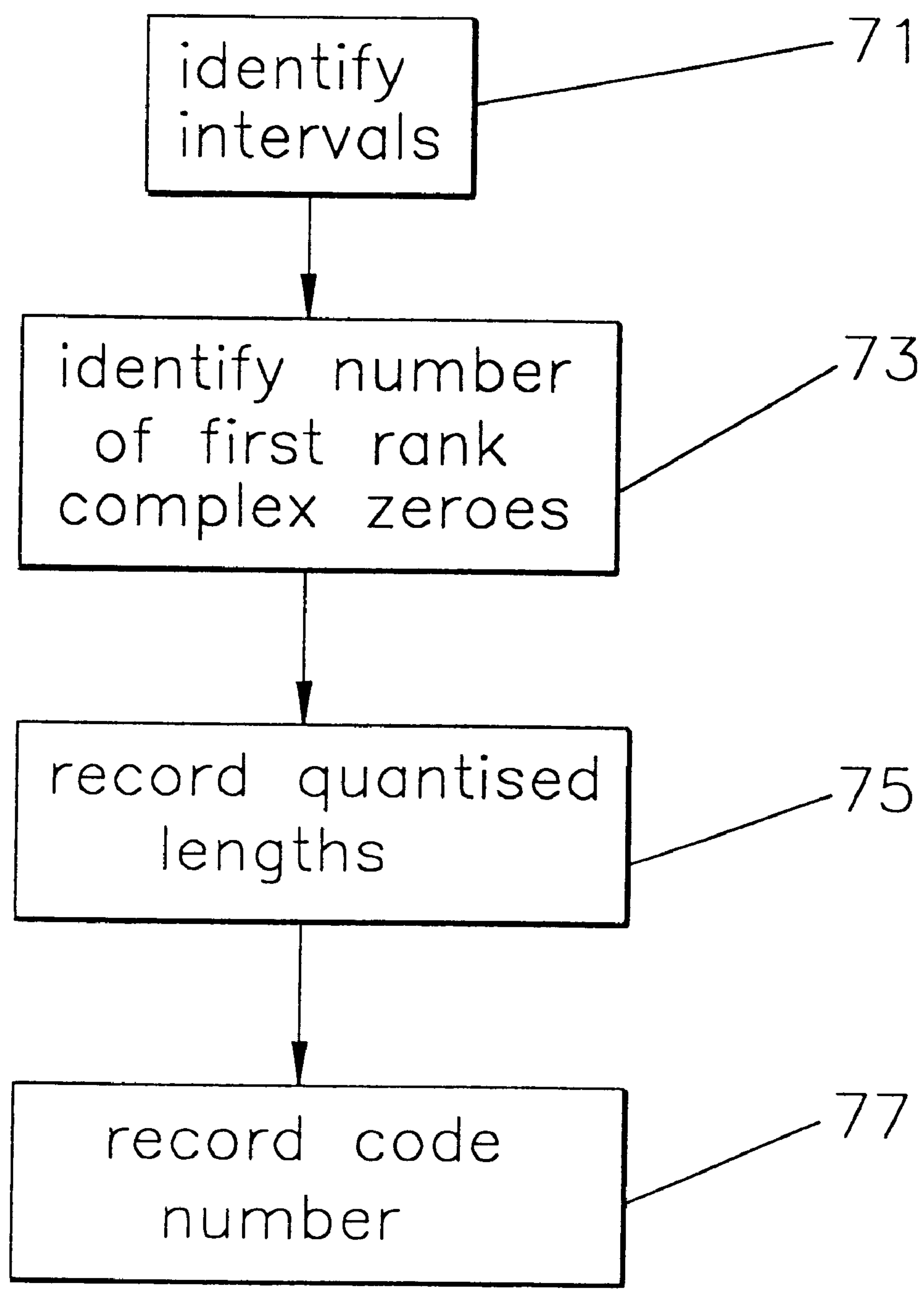
FIG. 7 is a flow diagram illustrating time encoding.

The time encoding is illustrated in FIG. 7. Firstly, in step 71, the signal is divided into intervals. Next, in step 73, the number of first rank zeroes is identified. The quantised lengths of the intervals and number of quantised zeroes are recorded in step 75. Finally, a code number representing the signal is stored in step 77.

In the specific example the method uses the so-called "TESPAR" method. A speech encoder known as TESPAR is known from the aforementioned GB2162024. The method of the invention may carry out the coding using the TESPAR method and specific hardware adapted to implement the method. The TESPAR method will now be described.

Any band limited signal can be represented exactly in terms of its real and complex zeros, such that $$f(t)=\prod_i (t-\tau_i) \tag{1}$$

where $\tau_i$ are the zeros of the function. Real zeros correspond to times where the function f(t) crosses the zero line.

Complex zeros occur in conjugate pairs for a real function and can be classified by considering the effect of differentiation with respect to time. The rank of a complex zero is defined as the number of differentiations required to produce a real zero at the same time ordinate as the complex zero. Thus positive minima (minima at positive values) and negative maxima (maxima at negative values) of the waveform correspond to first rank complex zeros because these stationary points become zero crossings when the waveform is differentiated once.

The waveform in TESPAR may be divided up into sections using the real zeros as the boundary points between sections. Each interval between two real zeros is then referred to as an epoch. This is not the only method available, but it is simple and usually effective.

Once the epochs have been defined some relevant information needs to be recorded about them. This conventionally includes the length of the interval (duration) of the epoch; its maximum amplitude and the number of first rank zeros. At this point the duration is usually represented as the nearest integer number of samples of the waveform rather than the exact time duration. The result is a matrix of values of size (3×number of epochs) containing some of the information contained in the waveform.

It should be noted that at this point an approximation to the original waveform could still be regenerated. It would not be exact since the duration of each epoch has been quantised and only the presence of first rank zeros has been noted. The position of the zeros and the existence of higher rank zeros are not recorded. However, there is sufficient information stored to allow a good approximation to the original waveform to be generated in the sense that a regenerated speech signal is easily understood.

Once the epochs have been defined and their parameters recorded the time encoding can be done. There are many schemes for encoding a signal once it has been stored in epoch form as described above (called the natural TESPAR stream). The general idea however is to take each epoch in turn, or several epochs at a time, and produce a code number depending upon the information stored in the epoch(s). A common encoding scheme considers the duration and number of first rank zeroes and returns a single code number, dependent upon these values, ranging between 1 and 28.

When the epochs have been encoded some more information has been lost, but a signal can still be regenerated. However, at this point the aim is not usually to regenerate the signal but to produce a compact format that will allow the waveform to be characterised and compared with other waveforms. To this end the code numbers for each epoch are combined into one of a variety of possible matrices. The more common types of matrix are described below.

The matrix is actually a vector of length equal to the number of TESPAR codes used to describe all the different types of epoch. Each element of the vector contains the number of times that an epoch with that code occurred in the signal. The resulting vector contains information about the content of the signal but no information about the ordering of the epochs, which means the signal cannot be regenerated without extra information.

The 'S' matrix can be further refined. Rather than incrementing an element of the vector by one for each epoch with the appropriate code the element can be incremented by an amount that depends upon some characteristic of the epoch. This leads to the duration weighted 'S' matrix, where the elements are incremented by an amount dependent on the duration of the epoch and the amplitude weighted 'S' matrix where the maximum epoch amplitude is used as weighting. In addition the final matrix itself can be modified. For example the number in each element of the 'S' matrix can be doubled to produce a matrix that is more heavily weighted by the number of epochs that occur in the waveform.

The 'A' matrix is a two dimensional matrix that is generated by considering pairs of epochs in turn. These can be adjacent epochs or they can have a specified separation (called the lag). Each epoch in the pair will have a TESPAR code associated with it which gives two ordinates that specify the element of the matrix that is to be incremented. The 'A' matrix is similar to the 'S' matrix but some information as to the ordering of the epochs is retained. As with the 'S' matrix the elements of the 'A' matrix can be weighted according to some combination of epoch parameters.

It is possible to extend the idea of the 'A' matrix by considering groups of three epochs at a time to produce a three dimensional matrix. Indeed this can be extended up to the number of epochs in the signal at which point there is one non-zero element in a matrix with the same number of dimensions as there are epochs in the waveform.

The 'DZ' matrix is generated by considering pairs of epochs and looking at how they change. Specifically the maximum amplitude, duration and number of complex first rank zeros are examined in each epoch. Each of these parameters may increase, decrease or stay the same which gives 27 possible combinations and hence a 27 element vector. Thus the 'DZ' matrix looks similar to an 'S' matrix. Since duration and amplitude are nearly continuous it is usual to specify a range of changes for these values that are taken to be the same for the purposes of encoding the 'DZ' matrix.

To illustrate how an end-point finding approach might work consider a speech waveform with individual words separated by silence. The signal is divided up into short time segments (say 20 ms) and each time segment encoded into an 'S' matrix. Each element of these 'S' matrices is then summed up to give one number per time slice reflecting how many epochs are present in each time slice. Note that the silence may include a lot of small amplitude epochs as unavoidable background noise. In this case some form of suppression is required such as ignoring all epochs with maximum amplitude less than a certain value. This simple graph will then have low values for regions of silence and high values in regions where a word is being spoken, which allows the end points of the words to be estimated.

Once the appropriate section of a waveform has been located and encoded in some form of matrix it usually needs to be categorised as an example of a previously known signal. The two most common approaches are to use archetypal matrices or to use a neural net.

Given a set of examples of a particular signal an archetypal matrix can be generated by simply adding the matrices together and dividing by the number of matrices used. To test to see if a signal is the same as the one represented by the archetype the signal needs to be encoded in the same matrix format as the archetype and then compared, usually by finding the correlation score. In this way many archetypes can be included and ranked as to which are most likely to be the same as the signal.

If better discrimination is required than that afforded by using archetype matrices a neural net may be used. Since a signal of any length will always produce a matrix of the same size when it is time encoded (assuming the same matrix is used, of course) a neural net can be designed with a fixed number of inputs corresponding to the number of elements in the matrix. With sufficient training examples the neural net can be trained to recognise a number of standard signals.

Returning to FIG. 1 in step 7, the processing unit 15 determines on the basis of the TESPAR output in combination with the conventional Markov scores the likely identity of the input speech element from amongst the candidate speech elements. The decision may also be based on a linguistic analysis of speech, i.e. on the likely speech element that follows previous speech elements, as is known.

In step 9, the system 11 outputs the determined speech element. The output may be to a data carrier, to a screen 17, or otherwise.

Figure 3:
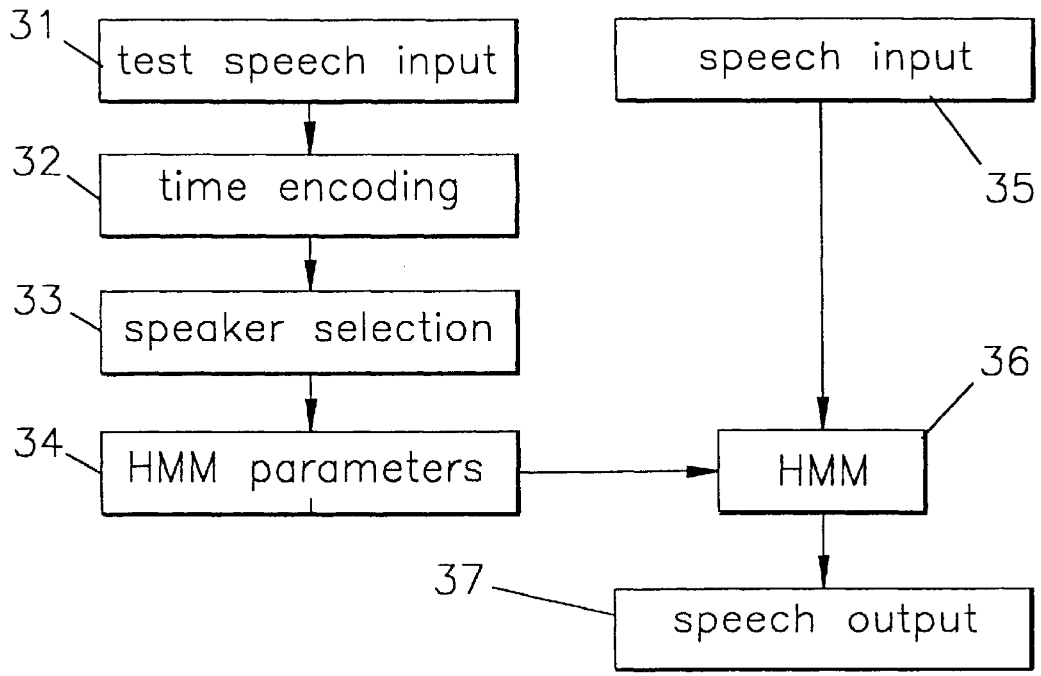
FIG. 3 is a flow diagram of a method according to a specific embodiment of the invention.

Referring to FIG. 3, a specific embodiment of a method according to the invention has two speech inputs. The first is a test string (such as "Computer, recognise my voice.") that is provided before the main speech input 35. This test string authentication phrase 31 is encoded in step 32 using the TESPAR method described above to produce a matrix that is then used to select (in step 33) the most likely speaker from a set of known people. Alternatively, the first part of the main speech can be used to identify the speaker. When the user has been recognised the parameters of the HMM can be adjusted in step 34 to those that have been previously found from training with that person's voice. The HMM then takes (in step 36) the main speech input and uses its newly configured state to assign probabilities to the different speech elements, which are then output in step 37 in the required manner. In this way a speaker dependant recognition system can be adapted to become a speaker independent system.

Figure 4:
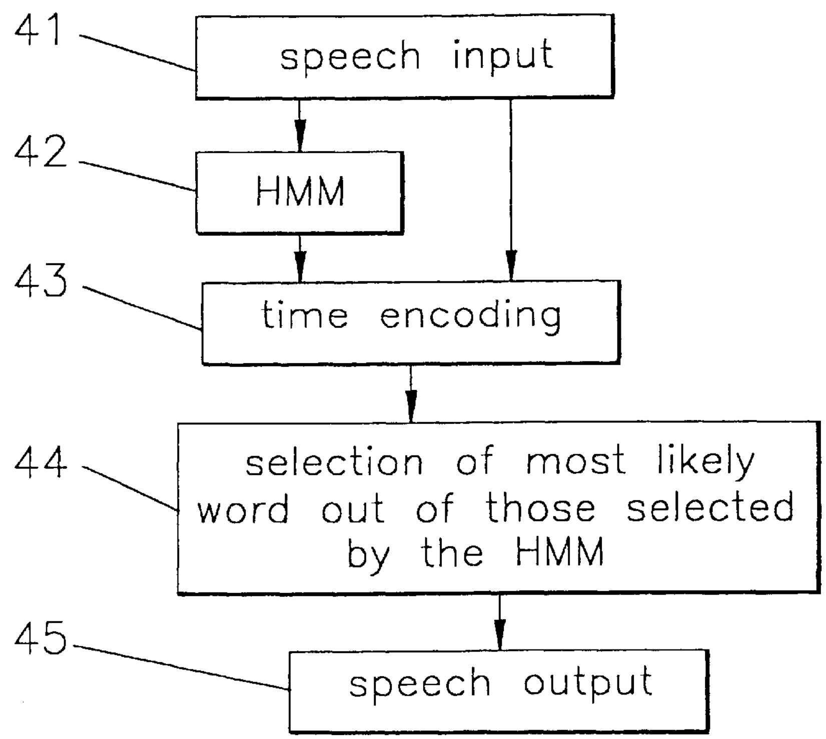
FIG. 4 is a flow diagram of a further embodiment of a method according to the invention.

Another approach for improving the recognition rate of speech is illustrated in FIG. 4. In this case the HMM takes the speech input signal 41 and assigns (in step 42) probabilities to the various speech elements as usual. The output consists of probabilities for various speech elements and the associated segment of the speech signal.

These are then fed into the next section where the signal is time encoded (in step 43) and a selection is made in step 44 of the most likely speech element from those found by the HMM. In this way the selection process of the HMM is refined by the TESPAR system to provide a more accurate recognition system.

Figure 5:
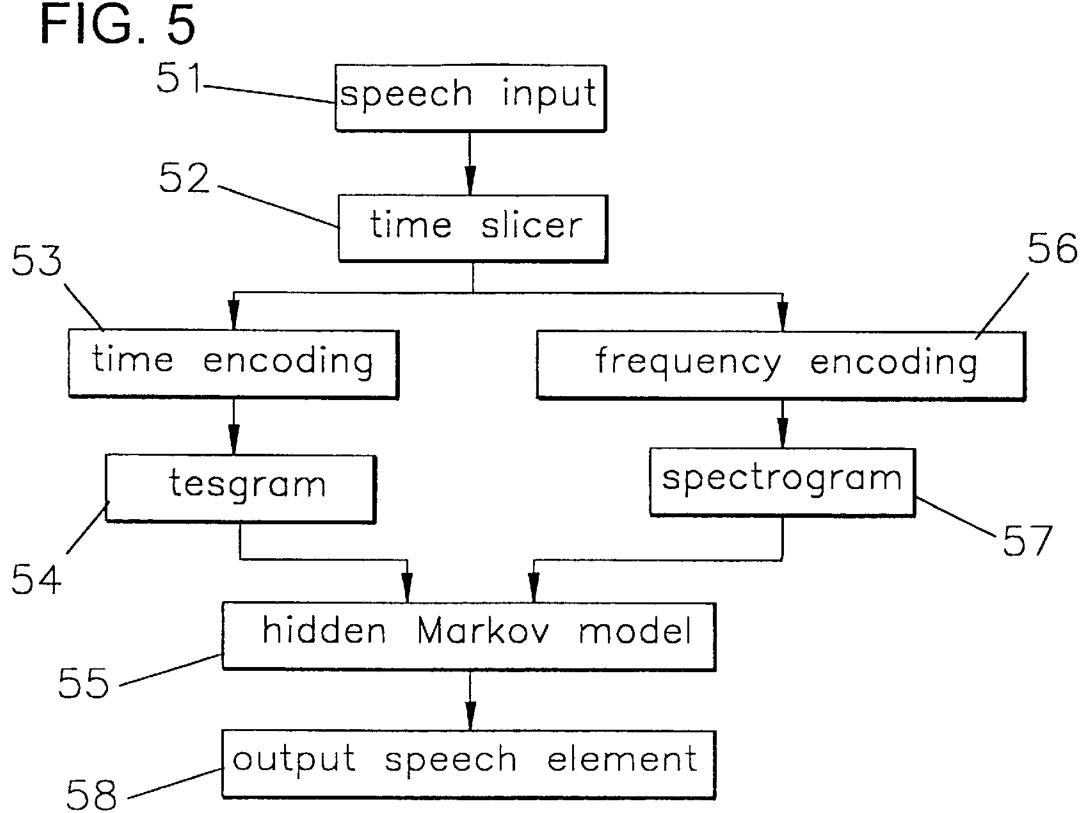
FIG. 5 is a flow diagram of another embodiment of a method according to the invention.

A further approach for incorporating TESPAR into a HMM speech recognition system is illustrated in FIG. 5. Here, the speech input signal 51 is divided up in step 52 into short time segments and processed in two ways. The first is the conventional HMM approach where the signal is transformed into the frequency domain (in step 56) to produce (in step 57) a spectrogram. The second is to time encode (in step 53) each time segment to produce a TESPAR matrix. The elements of this matrix are then arranged in the same way as the values in the different frequency bins in the spectrogram. This yields (step 54) the so-called "Tesgram". There are now two different sets of input parameters that are used as the input to the HMM. This extra information in the input to the HMM will then be used to provide enhanced recognition performance. The HMM then calculates (in step 55) the most likely speech input and outputs the result in step 58.

Figure 6:
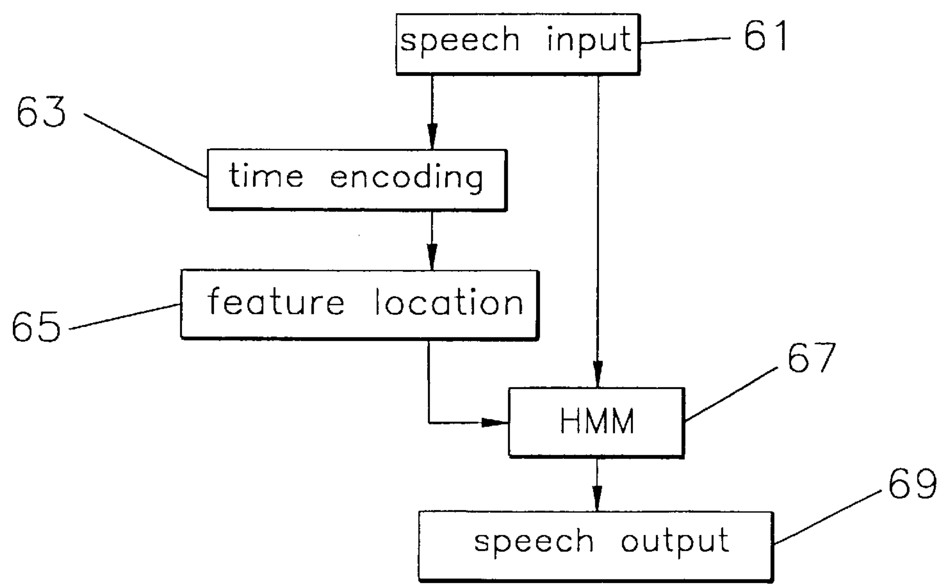
FIG. 6 is a flow diagram illustrating location finding using the method according to the invention.

An application to location finding will now be described with reference to FIG. 6. In this example the speech input signal 61 is firstly divided up into short time segments and these are time encoded (step 63) using the TESPAR method. This sequence of encoded time slices is then analysed (step 65) to locate specific features, such as periods of silence between words. The time locations of these features are then fed into the HMM along with the original signal so that the system can analyse (step 67) the speech with foreknowledge of where specific features are.

What is claimed is:

1. A speech recognition method including the steps of inputting speech to be recognised, encoding the input speech using time encoding, using a hidden Markov model to determine scores indicating how the input speech matches some or all of a plurality of speech elements, determining which, if any, speech element best corresponds to the input speech using both the time encoded speech and the Markov scores, and outputting the speech element, if any, so determined.

2. A speech recognition method according to claim 1, wherein the time encoding step includes identifying the intervals between the occurrences of the input crossing a given value, and quantising the lengths of the intervals, identifying the number of complex zeroes of the input parameter, up to a predetermined rank, in the said intervals, and recording the quantised lengths of the intervals and a measure of the said number complex zeroes up to a predetermined rank as a representation of the variation of the input parameter.

3. A method according to claim 2, wherein the predetermined rank is 1.

4. A method according to claim 3, wherein the coding method is a TESPAR method.

5. A method according to claim 4, further comprising the step of generating a code number taking one of a set of predetermined values representing the duration of the interval and number of maxima and minima for at least some of the said intervals.

6. A method according to claim 5, wherein the step of determining the best corresponding speech element uses linguistic analysis of previously output speech elements.

7. A method according to claim 3, further comprising the step of generating a code number taking one of a set of predetermined values representing the duration of the interval and number of maxima and minima for at least some of the said intervals.

8. A method according to claim 7, wherein the step of determining the best corresponding speech element uses linguistic analysis of previously output speech elements.

9. A method according to claim 2, further comprising the step of generating a code number taking one of a set of predetermined values representing the duration of the interval and number of maxima and minima for at least some of the said intervals.

10. A method according to claim 9, wherein the step of determining the best corresponding speech element uses linguistic analysis of previously output speech elements.

11. A method according to claim 2, wherein the step of determining the best corresponding speech element uses linguistic analysis of previously output speech elements.

12. A method according to claim 1, wherein the step of determining the best corresponding speech element uses linguistic analysis of previously output speech elements.

13. A speech recognition system comprising speech capture system for inputting speech to be recognised, a hidden Markov speech recognition system for determining scores indicating how the input speech matches some or all of a plurality of speech elements, a time encoded speech system for encoding the input speech, and a decision system for determining which, if any, speech element best corresponds to the input speech using both the time encoded speech and the Markov scores.

14. A computer program recorded on a data carrier operable to control a computer system having a processing unit, a speech input and an output system, the program operable to control the computer system to carry out the method of inputting speech to be recognised, encoding the input speech using time encoding, using a hidden Markov model to determine scores indicating how the input speech matches some or all of a plurality of speech elements, determining which, if any, speech element best corresponds to the input speech using both the time encoded speech and the Markov scores, and outputting the speech element, if any, so determined.

15. A computer program according to claim 14 wherein the time encoding step includes identifying the intervals between the occurrences of the input crossing a given value, and quantising the lengths of the intervals, identifying the number of complex zeroes of the input parameter, up to a predetermined rank, in the said intervals, and recording the quantised lengths of the intervals and a measure of the said number complex zeroes up to a predetermined rank as a representation of the variation of the input parameter.

* * * * *